US008155304B2

(12) United States Patent
Li et al.

(10) Patent No.: US 8,155,304 B2
(45) Date of Patent: Apr. 10, 2012

(54) FILTER BANK OPTIMIZATION FOR ACOUSTIC ECHO CANCELLATION

(75) Inventors: Qin Li, Redmond, WA (US); Wei-ge Chen, Sammamish, WA (US); Chao He, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1367 days.

(21) Appl. No.: 11/784,893

(22) Filed: Apr. 10, 2007

(65) Prior Publication Data

US 2008/0253553 A1    Oct. 16, 2008

(51) Int. Cl.
*H04M 9/08* (2006.01)
(52) U.S. Cl. .......... 379/406.12; 379/406.03; 379/406.08
(58) Field of Classification Search ............. 379/406.01, 379/406.05, 406.06, 406.13, 406.12, 406.08, 379/406.03
See application file for complete search history.

(56) References Cited

U.S. PATENT DOCUMENTS

| 5,329,587 | A | 7/1994 | Morgan et al. |
|---|---|---|---|
| 5,548,642 | A | 8/1996 | Diethorn |
| 5,721,772 | A | 2/1998 | Haneda et al. |
| 5,937,009 | A | 8/1999 | Wong et al. |
| 6,628,781 | B1 | 9/2003 | Grundstrom et al. |
| 6,757,385 | B1 | 6/2004 | Ehrenstråle et al. |
| 6,865,270 | B1 | 3/2005 | Troxel |
| 6,947,550 | B2 | 9/2005 | Xiong |
| 6,961,422 | B2 | 11/2005 | Boland |
| 7,120,259 | B1 | 10/2006 | Ballantyne et al. |
| 7,171,003 | B1 | 1/2007 | Venkatesh et al. |
| 2006/0098810 | A1 | 5/2006 | Kim |
| 2007/0041575 | A1* | 2/2007 | Alves et al. ............. 379/406.08 |

FOREIGN PATENT DOCUMENTS

WO    WO2006071119 A1    7/2006

OTHER PUBLICATIONS

Haan, et al., "Filter Bank Design for Subband Adaptive Microphone Arrays", Date: Jan. 2003, vol. 11, No. 1, http://ieeexplore.ieee.org/iel5/89/26485/01179374.pdf?isNumber=.
Soni, et al., "New Efficient Iterative Optimization Algorithm to Design the Two Channel QMF Bank", Date: Dec. 2006, vol. 18, http://www.enformatika.org/data/v18/v18-39.pdf.
Tanrikulu, et al., "Cascaded Power Symmetric IIR Filter Banks and Continuity Constrained Adaptive Algorithms for Acoustic Echo Cancellation in Subbands", Date: Aug. 1998, vol. 46, No. 8, http://ieeexplore.ieee.org/iel4/78/15244/00705440.pdf?isNumber=.
Tanrikulu, et al., "Residual Echo Signal in Critically Sampled Subband Acoustic Echo Cancellers Based on IIR and FIR Filter Banks", Date: Apr. 1997, vol. 45, No. 4, http://ieeexplore.ieee.org/iel4/78/12255/00564178.pdf?isNumber=.

* cited by examiner

*Primary Examiner* — Simon Sing
*Assistant Examiner* — Simon King
(74) *Attorney, Agent, or Firm* — Mayer & WIlliams P.C.

(57) ABSTRACT

A communications device is presented for providing bi-directional audio communications between a near-end user and a far-end user via a bidirectional communications channel. The communications device includes an adaptive echo canceller receiving a near-end audio signal and a far-end audio signal and providing an echo-canceled near-end audio signal for transmission to the far-end user via the communications channel. The adaptive echo canceller includes a first bank of analysis filters for filtering the near-end audio signal, a second bank of analysis filters for filtering the far-end audio signal, and a bank of synthesis filters for filtering sub-band echo-canceled signals generated within the adaptive echo canceller. The first and second filter banks have a frequency response optimized to reduce echo residual gain.

5 Claims, 3 Drawing Sheets

FILTER BANK OPTIMIZATION FOR ACOUSTIC ECHO CANCELLATION

BACKGROUND

Acoustic Echo Cancellation (AEC) is a digital signal processing technology which is used to remove the acoustic echo from a speaker phone in two-way or multi-way communication systems, such as traditional telephone or modern internet audio conversation applications.

FIG. 1 illustrates an example of one end 105 of a typical two-way communication system, which includes a capture stream path and a render stream path for the audio data in the two directions. The other end is exactly the same. In the capture stream path in the figure, an analog to digital (A/D) converter 122 converts the analog sound captured by microphone 110 to digital audio samples continuously at a sampling rate ($fs_{mic}$). The digital audio samples are saved in capture buffer 130 sample by sample. The samples are retrieved from capture buffer in frame increments (herein denoted as "mic[n]"). Frame here means a number (n) of digital audio samples. Finally, samples in mic[n] are processed and sent to the other end.

In the render stream path, the system receives audio samples from the other end, and places them into a render buffer 140 in periodic frame increments (labeled "spk[n]" in the figure). Then the digital to analog (D/A) converter 150 reads audio samples from the render buffer sample by sample and converts them to analog signal continuously at a sampling rate, $fs_{spk}$. Finally, the analog signal is played by speaker 160.

In systems such as that depicted by FIG. 1, the near end user's voice is captured by the microphone 110 and sent to the other end. At the same time, the far end user's voice is transmitted through the network to the near end, and played through the speaker 160 or headphone. In this way, both users can hear each other and two-way communication is established. But, a problem occurs if a speaker is used instead of a headphone to play the other end's voice. For example, if the near end user uses a speaker as shown in FIG. 1, his microphone captures not only his voice but also an echo of the sound played from the speaker (labeled as "echo(t)"). In this case, the mic[n] signal that is sent to the far end user includes an echo of the far end user's voice. As the result, the far end user would hear a delayed echo of his or her voice, which is likely to cause annoyance and provide a poor user experience to that user.

Practically, the echo echo(t) can be represented by speaker signal spk(t) convolved by a linear response g(t) (assuming the room can be approximately modeled as a finite duration linear plant) as per the following equation:

$$\text{echo}(t) = \text{spk}(t) * g(t) = \int_0^{T_e} g(\tau) \cdot \text{spk}(t-\tau) d\tau \quad (1)$$

where * means convolution, $T_e$ is the echo length or filter length of the room response. The room response g(t) is often called the "echo path."

In order to remove the echo for the remote user, AEC 250 is added to the end 100 of the system shown in FIG. 2. When a frame of samples in the mic[n] signal is retrieved from the capture buffer 130, they are sent to the AEC 250. At the same time, when a frame of samples in the spk[n] signal is sent to the render buffer 140, they are also sent to the AEC 250. The AEC 250 uses the spk[n] signal from the far end to predict the echo in the captured mic[n] signal. Then, the AEC 250 subtracts the predicted echo from the mic[n] signal. This difference or residual is the clear voice signal (voice[n]), which is theoretically echo free and very close to near end user's voice (voice(t)).

FIG. 3 depicts an implementation of the AEC 250 based on an adaptive filter 310. The AEC 250 takes two inputs, the microphone signal mic[n], which contains the echo and the near-end voice, and the spk[n] signal, which is received from the far end. The spk[n] signal is used to predict the echo signal. The prediction residual signal e[n] is used to adaptively update the cancellation filter h[n] when there is no near-end voice present. The prediction residual signal e[n] is also output by the adaptive filter. When a near-end voice is present, e[n] contains the echo-free, clear near-end voice, which is sent to the far end. Adaptive filter 310 is also referred to as adaptive echo canceller.

The actual room response (that is represented as g(t) in the above convolution equation) usually varies with time, such as due to change in position of the microphone 110 or speaker 160, body movement of the near end user, and even room temperature. The room response therefore cannot be predetermined, and must be calculated adaptively at running time. The AEC 250 commonly is based on adaptive filters such as Least Mean Square (LMS) adaptive filters 310, which can adaptively model the varying room response. The LMS algorithm is a least square stochastic gradient step method which, as it is both efficient and robust, is often used in many real-time applications. The LMS algorithm and its well known variations (e.g., the Normalized LMS, or NLMS algorithm) do have certain drawbacks, however. For example, the LMS and other known algorithms can sometimes be slow to converge (i.e., approach the target filtering characteristic, such as the acoustic echo path in a hands-free telephony application), particularly when the algorithm is adapted, or trained, based on a non-white, or colored, input signal such as a human speech signal. Moreover, the order of the adaptive filter (i.e., the number of filter taps) can be quite high in the context of acoustic echo cancellation, and implementation of the adaptive filtering algorithm can therefore be computationally complex.

Consequently, recent work has focused on performing the adaptive filtering in sub-bands. In other words, filter banks are used to divide both the microphone signal and the loudspeaker signal into a number of frequency sub-bands. Each sub-band signal is then decimated, or down-sampled, and adaptive filtering is performed in each sub-band to provide a number of echo-canceled sub-band output signals. The resulting sub-band output signals are then interpolated, or up-sampled, and combined to reconstruct the overall echo-canceled microphone signal for transmission to the far-end user. Advantageously, the sub-sampling results in greater computational efficiency as compared to the full-band processing approach and, since variations in the spectral content of the input signals are less severe within each sub-band, overall convergence speed is also improved.

However, known sub-band adaptive filtering systems suffer from certain disadvantages as well. For example, signal aliasing between sub-bands can result in slow overall convergence and/or errors in the reconstructed microphone signal. In addition, non-causal coefficient effects arising from the sub-band filters' impulse response can reduce the quality of the cancellation process in the individual sub-bands. Consequently, there is a need for improved methods and apparatus for performing sub-band adaptive filtering in echo suppression systems.

SUMMARY

The following Detailed Description presents various ways to enhance AEC quality and robustness in two-way communication systems.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following description relates to implementations of audio echo cancellation having improved robustness and quality, and their application in two-way audio/voice communication systems (e.g., traditional or internet-based telephony, voice chat, and other two-way audio/voice communications). Although the following description illustrates the inventive audio echo cancellation in the context of an internet-based voice telephony, it should be understood that this approach also can be applied to other two-way audio communication systems and like applications.

Sub-Band Adaptive Filtering

Figure 2:
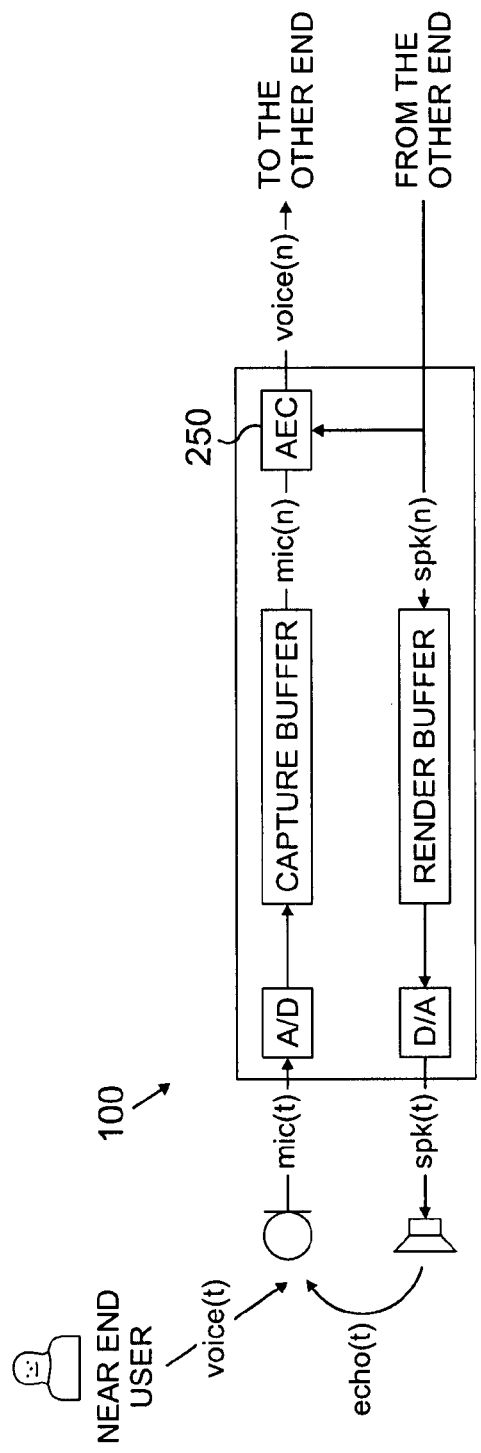
FIG. 2 is a block diagram of the two-way communication system of FIG. 1 with audio echo cancellation.
Figure 3:
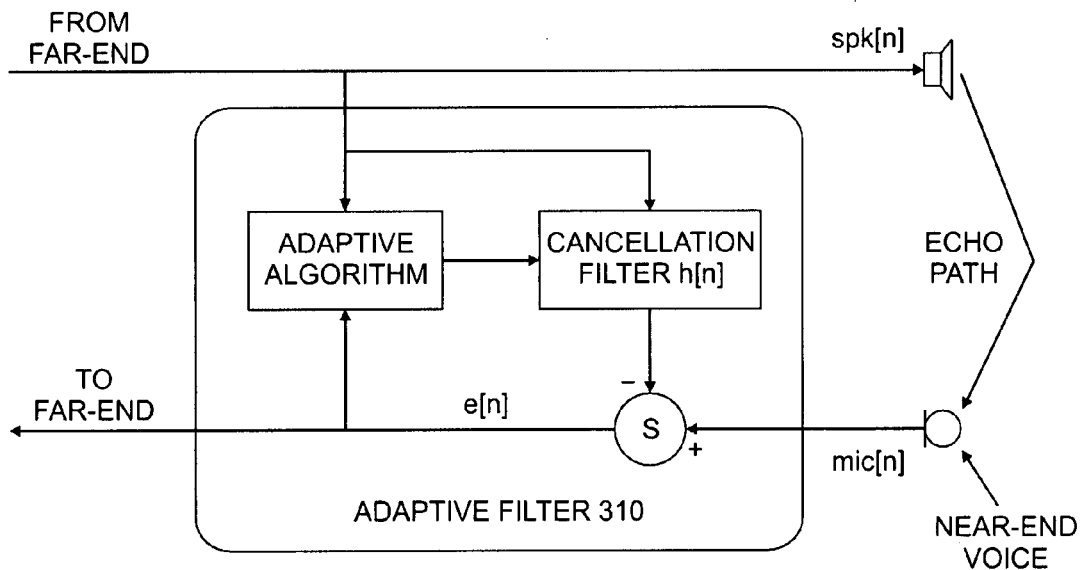
FIG. 3 is a block diagram of an implementation of audio echo cancellation based on an adaptive filter.
Figure 4:
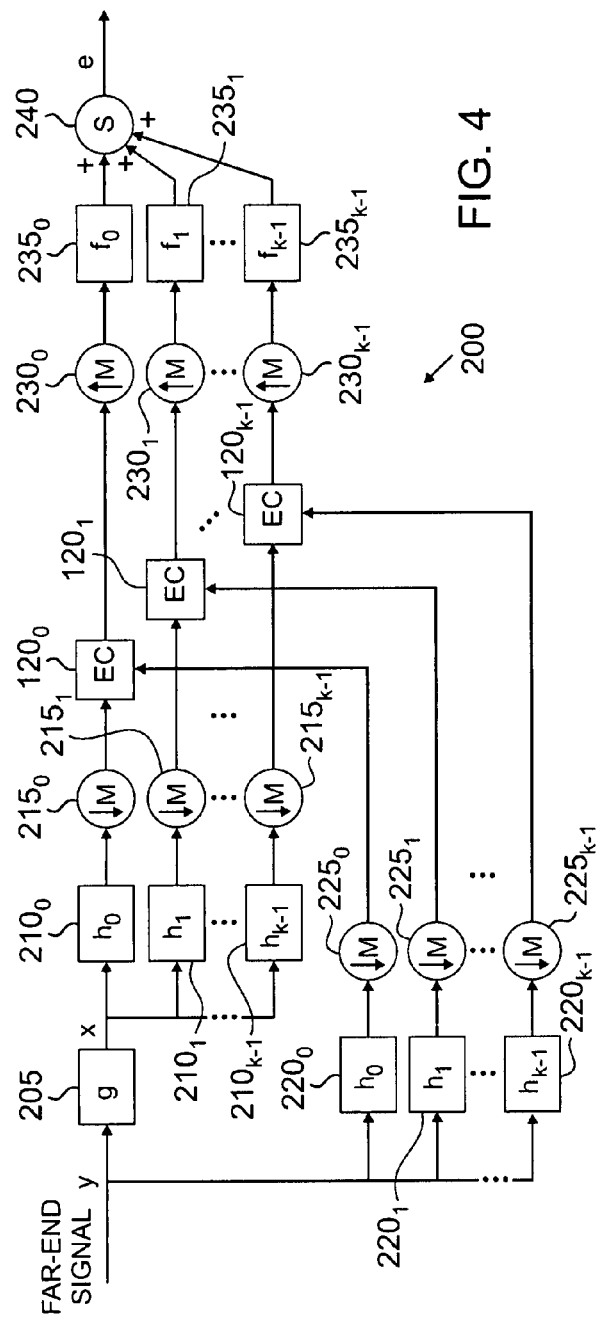
FIG. 4 depicts one example of a sub-band adaptive filtering arrangement.

FIG. 4 depicts one example of a sub-band adaptive filtering arrangement 200. The arrangement 200 can, for example, be used to provide the functionality of the AEC 250 of FIG. 2. As shown, the sub-band arrangement 200 includes a first bank of analysis filters $210_0$-$210_{K-1}$, a first bank of decimators $215_0$-$215_{K-1}$, a bank of sub-band adaptive echo canceller $120_0$-$120_{K-1}$, each of which same as the adaptive filter 310 shown in FIG. 3, a second bank of analysis filters $220_0$-$220_{K-1}$, a second bank of decimators $225_0$-$225_{K-1}$, a bank of interpolators $230_0$-$230_{K-1}$, a bank of synthesis filters $235_0$-$235_{K-1}$, and a reconstruction summing device 240. Those of ordinary skill in the art will appreciate that the components of FIG. 4 can be implemented using a variety of known hardware configurations, including a general purpose digital computer, standard digital signal processing components, and one or more application integrated circuits.

Figure 1:
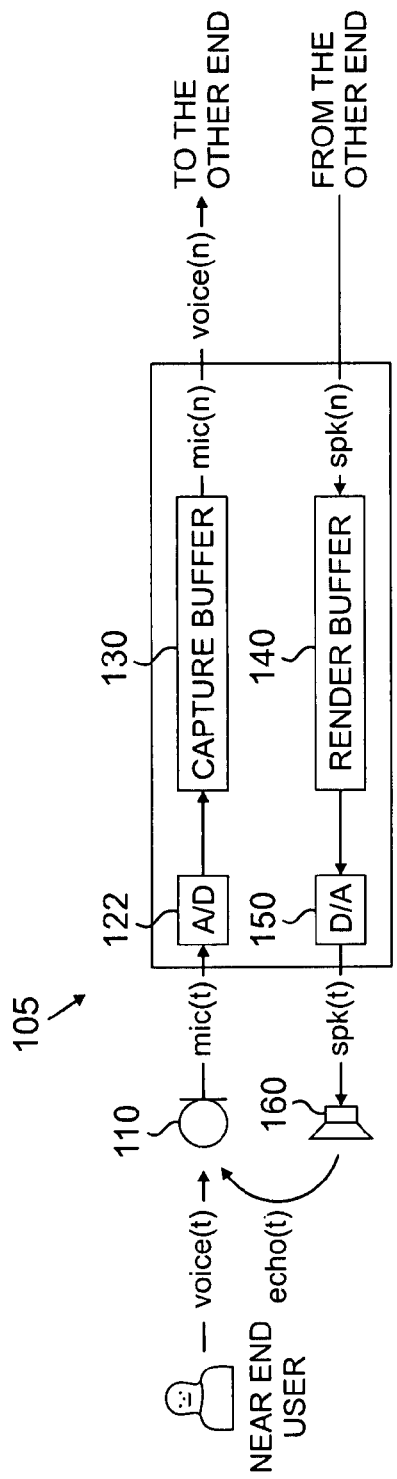
FIG. 1 is a block diagram illustrating one end of a typical two-way communication system.

In FIG. 4, a reference signal (e.g., the far-end speech signal of FIG. 1) is input to each of the second bank of analysis filters $220_0$-$220_{K-1}$. The reference signal also passed through an echo path 205 (e.g., the near-end environment of FIG. 1) and forms echoes. Additionally, echoes (output of the echo path 205) are input to each of the first bank of analysis filters $210_0$-$210_{K-1}$. An output of each of the first bank of analysis filters $210_0$-$210_{K-1}$ and an output of each of the second bank of analysis filter $215_0$-$215_{K-1}$ are coupled to sub-band echo cancellers $120_0$-$120_{K-1}$. An output of each one of the sub-band echo canceller $120_0$-$120_{K-1}$ is coupled to an input of a respective one of the bank of interpolators $230_0$-$230_{K-1}$.

An output of each of the interpolators $230_0$-$230_{K-1}$ is coupled to a respective one of the bank of synthesis filters $235_0$-$235_{M-1}$, and an output of each of the synthesis filters $235_0$-$235_{K-1}$ is coupled to a respective input of the reconstruction summing device 240. Output of the reconstruction summing device provides a reconstructed, full-band echo-canceled error signal.

In operation, the first bank of analysis filters $210_0$-$210_{K-1}$ splits the echo-containing signal (e.g., the microphone signal) into K (an integer) adjacent frequency bands, and the second bank of analysis filters $220_0$-$220_{K-1}$ splits the echo-causing or reference signal (e.g., the far-end speech signal) into the same K adjacent frequency bands. Since the spectral content of each sub-band signal is limited as compared to the full-band signal, each sub-band signal can be decimated, or down-sampled, by a factor M without loss of information. To reduce aliasing, M is usually chosen to be a fraction of K, typically half of K. Conventionally, the overall bandwidth of interest is divided into K equal sub-bands, each sub-band having a bandwidth of 1/M times the overall bandwidth. Accordingly, the first bank of decimators $215_0$-$215_{K-1}$ down-sample the echo-containing sub-band signals by a factor M, and the second bank of decimators $225_0$-$225_{K-1}$ down-sample the echo-causing sub-band signals by the same factor M in order to reduce computational complexity.

Thereafter, adaptive filter processing is carried out within each sub-band in a manner analogous to the above described full-band approach. Specifically, the sub-band echo cancellers $120_0$-$120_{K-1}$ adaptively filter the sub-band echo-causing signals to provide K echo-canceled output signals. (e.g., using an LMS or NLMS algorithm as shown in FIG. 3).

The interpolators $230_0$-$230_{K-1}$ then interpolate, or up-sample, the sub-band echo-canceled signals by the factor M to return to the original sample rate, and the synthesis filters $235_0$-$235_{K-1}$ K-1 filter the up-sampled, sub-band echo-canceled signals to cancel aliasing effects introduced by the down-sampling as is well known in the art. The bandwidths of the synthesis filters conventionally match those of the analysis filters (i.e., M equal bandwidth of 1/M times the overall bandwidth of interest). The resulting sub-band signals are then summed via the summing device 240 to produce, or reconstruct, the full-band echo-canceled signal (e.g., for transmission to the far-end user).

Those of skill in the art will appreciate that, although each filter block is shown operating in the time domain in FIG. 4, some or all of the filtering can be performed in the frequency domain as well (i.e., filtering by vector multiplication in the frequency domain is equivalent to filtering by sample-wise convolution in the time domain). Thus, the arrangement 200 of FIG. 4 can also include appropriate conversion processors as well (e.g., Fast Fourier Transform, or FFT, processors and Inverse Fast Fourier Transform, or IFFT, processors). Selection between time-domain and frequency domain filtering is a matter of design choice Modeling Non-causal Coefficients with Audio System Delays Suppose a room response is represented by a pure delay system $\delta(n-d_0)$, i.e. the echo path (room response) g(n) is given by $$g(n)=\delta(n-d_0). \qquad (2)$$

Then the microphone signal y(n) can be written as speaker signal x(n) convolving with the room response $$y(n)=x(n)*g(n)=x(n-d_0). \qquad (3)$$

Suppose we have a uniform Discrete Fourier Transform (DFT) filter bank with a prototype analysis filter h(n). The sub-band speaker signal $X_k(m)$ is given as $$X_k(m) = \sum_{n=-\infty}^{\infty} h(mM - n)x(n)W_K^{-kn}, \quad (4)$$

$$k = 0, 1, \ldots, K - 1$$

where $W_K = e^{j(2\pi/K)}$, K is number of sub-bands, k is sub-band index; n is the original discrete time index; m is down-sampled time index, and M is down-sampling ratio. Thus the sub-band microphone signal $Y_k(m)$ can be written as $$Y_k(m) = \sum_{n=-\infty}^{\infty} h(mM - n)x(n - d_0)W_K^{-kn}. \quad (5)$$

Replacing the variable $n' = n - d_0$ yields $$Y_k(m) = W_K^{-kd_0} \sum_{n'=-\infty}^{\infty} h\left(\left(m - \frac{d_0}{M}\right)M - n'\right)x(n)W_K^{-kn'} \quad (6)$$

$$= W_K^{-kd_0} X_k\left(m - \frac{d_0}{M}\right)$$

Therefore, when the sub-band approach is used, the sub-band room response of a pure delay system $G_k(m)$ can be written as $$G_k(m) = W_K^{-kd_0} \delta\left(m - \frac{d_0}{M}\right). \quad (7)$$

In traditional digital signal processing theory, because $X_k(m)$ is a discrete signal and $$\left(m - \frac{d_0}{M}\right)$$

is in general not an integer, $$X_k\left(m - \frac{d_0}{M}\right) \text{ and } \delta\left(m - \frac{d_0}{M}\right)$$

do not exist. They are used here for simple expressions of fractional delay. According to sampling theory, a general expression of delay for any real number d can be written as a sinc function:

$$\delta(n - d) = \text{sinc}(n - d) = \frac{\sin[\pi(n - d)]}{\pi(n - d)}. \quad (8)$$

So the complete sub-band response is given by $$G_k(m) = W_K^{-kd_0} \frac{\sin(\pi(mM - d_0)/M)}{\pi(mM - d_0)/M}, \quad (9)$$

$$-\infty < m < \infty,$$

and $Y_k(m)$ is the convolution of $X_k(m)$ and $G_k(m)$ $$Y_k(m) = W_K^{-kd_0} \sum_{l=-\infty}^{\infty} \frac{\sin(\pi(mM - d_0 - lM)/M)}{\pi(mM - d_0 - lM)/M} X_k(l). \quad (10)$$

In (9), the first term $W_K^{-kd_0}$ is a constant phase term; and the second term is a fractional delay arising from the echo path response impulse, which has an infinite response extending on both negative and positive times. The coefficients corresponding to $(mM-d_0)<0$ in (9) are non-causal as they are prior to the onset of the room response impulse.

Usually a sub-band echo cancellation system only models positive time coefficients (m>0) in (9), i.e. uses past and current speaker signals to predict current microphone signal and update filter coefficients. Therefore, there are $$\left\lceil \frac{d_0}{M} \right\rceil$$

non-causal coefficients that can be modeled, where ⌈ ⌉ denotes the ceiling of a fractional number. Rest of non-causal coefficients is truncated. Because $d_0$ is a variable depending on near-end environment, in worst case $d_0$ can be very short so that there is only one non-causal coefficient, which may cause high prediction errors, and consequently result in poor cancellation quality. The error associated with the truncation of non-causal filter coefficients of the room response is referred to as the non-causality coefficient effect.

An easy way to reduce the non-causality coefficient effect, is to deliberately add delay to the microphone signals so that more non-causal coefficients can be modeled in the adaptive filter method. Empirical tests have shown, for instance, that 10 non-causal filter coefficients is sufficient to reduce the non-causality effect well below the error caused by sub-band aliasing; and 5 non-causal coefficients are sufficient to reduce the non-causality effect largely. However, adding a delay to the microphone signal increases the delay of the whole communication system, thus in practice, it is rarely used.

Figure 5:
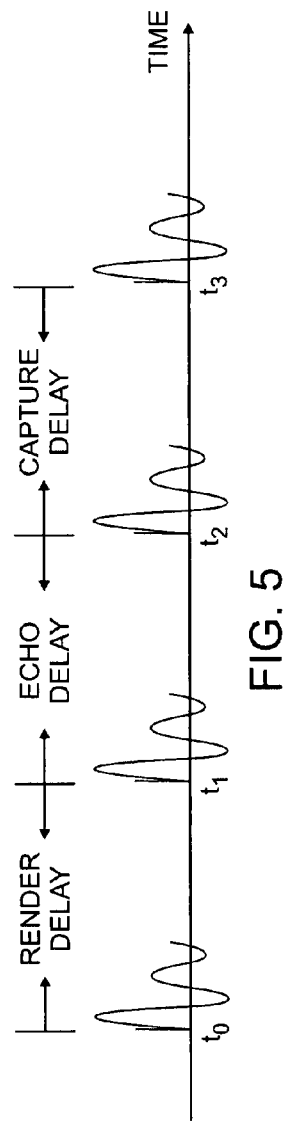
FIG. 5 depicts the relationship among various system delays that may be used to model the non-causal filter coefficients.

The methods and systems described herein detect and utilize inherent audio system delays in two-way communication systems (e.g., computers, speaker telephones, two-way radio, game consoles, conferencing equipment) to model the non-causal filter coefficients. For instance, in modern computers, particular on personal computers, there are several structural layers in the audio system from the application to hardware (e.g., D/A and A/D converters). Every layer may have its own buffer and contributes certain delay. For example, in Windows XP, there is typically a minimum of a 20 to 30 millisecond delay on render side between the time when a sample is sent to the render buffer and when the sample is actually played through the speaker (at the D/A converter). If an application has a longer buffer, the delay will be longer. Similarly on the capture side, there is a delay between the time when a sample is captured by the microphone (at the A/D converter) and when it is seen by an application. Such delays are necessary to achieve glitch-free audio streams on multi-task operation systems. Accordingly, such delays are virtually always present. Therefore, the system delays can be used to model the non-causal filter coefficients. FIG. 5 depicts the relationship among the various delays.

In FIG. 5, a frame of the audio signal is sent to the render buffer by an application at $t_0$; the signal is actually played through speaker at $t_1$; the signal is captured by the microphone at $t_2$; and the signal is acquired by the application at $t_3$. $(t_1-t_0)$ is the render delay in the capture buffers 130 of FIG. 1; $(t_2-t_1)$ is the echo delay; and $(t_3-t_2)$ is the capture delay in the render buffers 140 in FIG. 2. Thus, the render delay and the capture delay can be used to model the non-causal filter coefficients. In other words, the actual delay caused by the room response is $(t_2-t_1)$, but the total delay $(t_3-t_0)$ can be used to model the sub-band room response, of which $(t_1-t_0)+(t_3-t_2)$ is used for modeling the non-causal coefficients. The maximum number of allowed non-causal filter coefficients without inducing extra system delay is given by $$\left\lfloor \frac{(t_3-t_2)+(t_1-t_0)}{FrameSize} \right\rfloor, \quad (11)$$

where $\lfloor \ \rfloor$ denotes the floor of a fractional number, and "FrameSize" is the process frame size.

Optimizing the DFT Filter Bank by Minimizing Echo Residual Gain

One problem with the filter bank approach to sub-band processing is that the transition between bands makes it impossible to perfectly isolate each band from each adjacent band without the use of "ideal" band pass filters (i.e., filters with infinitely sharp cutoffs). There is a known trade-off between the amount of echo cancellation possible, the filter roll-off, filter group delay distortion, and reconstructability of the sub-bands to regenerate the original input signal without distortion. However, the use of the band-pass filters for echo cancellation suffers from problems relating to distortion caused by aliasing during the down sampling process. This problem arises because the spectrum in the stop-band of filters in filter bank is reflected onto the pass-band and becomes aliases. Since aliasing is nonlinear it cannot be canceled by an adaptive filter, thus limiting the amount of overall allowable echo cancellation using a sub-band adaptive filtering technique. Accordingly, the quality of the sub-band filtering technique is mainly limited by the total aliasing energy. Therefore, the aliasing energy is often minimized when designing the analysis filter banks 210 and 220. However, this only controls the sub-band cancellation quality. When the signal is reconstructed, the sub-band error signals are passed into the synthesis filters 235 and then interpolated to the original sampling rate. As a result the effects of all the filter banks and not just the analysis filters 210 and 220 should be taken into account.

Assume that in the filter banks 210 and 220, the analysis filter is $h_k(n)$ with a frequency response $H_k(e^{j\omega})$, and the synthesis filter in synthesis filters 230 is $f_k(n)$ with a frequency response $F_k(e^{j\omega})$. If the sub-band signals are not modified (i.e., if there is no processing in the sub-band domain), the spectrum of the reconstructed signal $\hat{X}(e^{j\omega})$ (i.e., the spectrum provided at the output of the summing device 240 in FIG. 4) can be written as $$\hat{X}(e^{j\omega}) = \frac{1}{M} \sum_{k=0}^{K-1} F_k(e^{j\omega}) \sum_{l=0}^{M-1} H_k(e^{j(\omega-2\pi l/M)}) X(e^{j(\omega-2\pi l/M)}) \quad (12)$$

A further assumption is that echoes in the pass-band of the analysis filters can be completely cancelled by an adaptive filter. In other words, in the k-th sub-band, the signal in the frequency range of $$\left[ \frac{2\pi k}{K} - \frac{\pi}{M}, \frac{2\pi k}{K} + \frac{\pi}{M} \right]$$

can be completely cancelled, because frequency components in this range remain linear after the decimation while components out of this range do not. This assumption is an ideal case. Due to limited filter length, this assumption cannot be realized in practice. However, it is approximately accurate up to the limitation of truncated filter length.

For simplicity, an ideal echo cancellation system can be incorporated into the filter bank analysis filter by modifying the frequency response of the analysis filter $H_k(e^{j\omega})$ to $$H'_k(e^{j\omega}) = \begin{cases} 0, & \omega \in \left[ \frac{2\pi k}{K} - \frac{\pi}{M}, \frac{2\pi k}{K} + \frac{\pi}{M} \right] \\ H_k(e^{j\omega}), & \text{otherwise} \end{cases} \quad (13)$$

Replacing $H_k(e^{j\omega})$ with $H_k'(e^{j\omega})$ in (12) yields total echo residual of a sub-band echo cancellation system (FIG. 4).

$$\hat{X}'(e^{j\omega}) = \frac{1}{M} \sum_{k=0}^{K-1} F_k(e^{j\omega}) \sum_{l=0}^{M-1} H'_k(e^{j(\omega-2\pi l/M)}) X(e^{j(\omega-2\pi l/M)}) \quad (14)$$

An "echo residual gain" can thus be defined as $$G_e(e^{j\omega}) = \frac{1}{M} \left( \sum_{k=0}^{K-1} |F_k(e^{j\omega})|^2 \sum_{l=0}^{M-1} |H'_k(e^{j(\omega-2\pi l/M)})|^2 \right)^{1/2} \quad (15)$$

Accordingly, when designing the DFT filter banks for a sub-band echo cancellation system, i.e. finding a set of optimal analysis and synthesis filters to achieve best echo cancellation quality, besides the well known criterion of minimizing sub-band aliasing, the echo residual gain in (15) should also be minimized.

Computing Environment

The above-described AEC digital signal processing techniques can be realized on any of a variety of two-way communication systems, including among other examples, computers; speaker telephones; two-way radio; game consoles; conferencing equipment; and etc. The AEC digital signal processing techniques can be implemented in hardware circuitry, in firmware controlling audio digital signal processing hardware, as well as in communication software executing within a computer or other computing environment, such as shown in FIG. 6.

Figure 6:
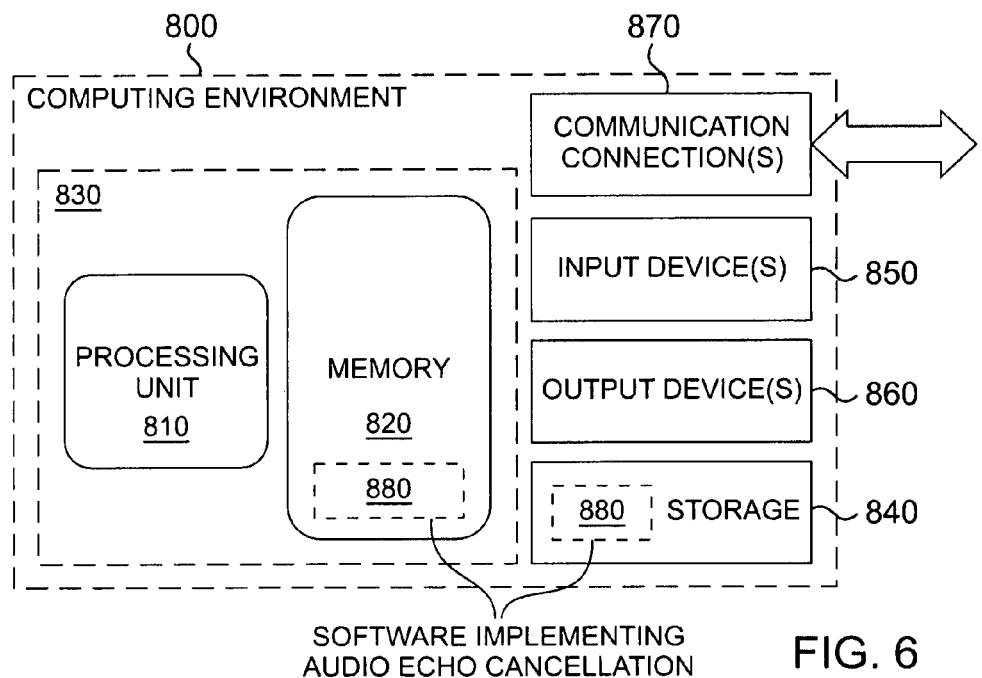
FIG. 6 is a block diagram of a suitable computing environment for implementing a two-way communication system utilizing the AEC implementation having improved robustness and quality.

FIG. 6 illustrates a generalized example of a suitable computing environment (800) in which described embodiments may be implemented. The computing environment (800) is not intended to suggest any limitation as to scope of use or functionality of the invention, as the present invention may be implemented in diverse general-purpose or special-purpose computing environments.

With reference to FIG. 6 the computing environment (800) includes at least one processing unit (810) and memory (820). In FIG. 6, this most basic configuration (830) is included within a dashed line. The processing unit (810) executes computer-executable instructions and may be a real or a virtual processor. In a multi-processing system, multiple processing units execute computer-executable instructions to increase processing power. The memory (820) may be volatile memory (e.g., registers, cache, RAM), non-volatile memory (e.g., ROM, EEPROM, flash memory, etc.), or some combination of the two. The memory (820) stores software (880) implementing the described audio digital signal processing for robust and high quality AEC.

A computing environment may have additional features. For example, the computing environment (800) includes storage (840), one or more input devices (850), one or more output devices (860), and one or more communication connections (870). An interconnection mechanism (not shown) such as a bus, controller, or network interconnects the components of the computing environment (800). Typically, operating system software (not shown) provides an operating environment for other software executing in the computing environment (800), and coordinates activities of the components of the computing environment (800).

The storage (840) may be removable or non-removable, and includes magnetic disks, magnetic tapes or cassettes, CD-ROMs, CD-RWs, DVDs, or any other medium which can be used to store information and which can be accessed within the computing environment (800). The storage (840) stores instructions for the software (880) implementing the described audio digital signal processing for robust and high quality AEC.

The input device(s) (850) may be a touch input device such as a keyboard, mouse, pen, or trackball, a voice input device, a scanning device, or another device that provides input to the computing environment (800). For audio, the input device(s) (850) may be a sound card or similar device that accepts audio input in analog or digital form, or a CD-ROM reader that provides audio samples to the computing environment. The output device(s) (860) may be a display, printer, speaker, CD-writer, or another device that provides output from the computing environment (800).

The communication connection(s) (870) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The described audio digital signal processing for AEC techniques herein can be described in the general context of computer-readable media. Computer-readable media are any available media that can be accessed within a computing environment. By way of example, and not limitation, with the computing environment (800), computer-readable media include memory (820), storage (840), communication media, and combinations of any of the above.

The described audio digital signal processing for robust and high quality AEC techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

The invention claimed is:

1. A communications device for providing bi-directional audio communications between a near-end user and a far-end user via a bidirectional communications channel, comprising:
   an adaptive echo canceller receiving a near-end audio signal and a far-end audio signal and providing an echo-canceled near-end audio signal for transmission to the far-end user via the communications channel;
   said adaptive echo canceller including a first bank of analysis filters for filtering the near-end audio signal, a second bank of analysis filters for filtering the far-end audio signal, and a bank of synthesis filters for filtering sub-band echo-canceled signals generated within said adaptive echo canceller;
   wherein the first and second analysis filter banks and the bank of synthesis filters have a frequency response optimized to minimize echo residual gain.

2. The communications device of claim 1 wherein the filters in the first and second filter banks is implemented with a Discrete Fourier Transform (DFT).

3. The communications device of claim 1 wherein the frequency response of the first and second analysis filter banks include non-casual filter coefficients modeled using system delays.

4. The communications device of claim 3 wherein the system delays include render and capture buffer delays.

5. The communications device of claim 1 further comprising:
   a first bank of decimators coupled to receive and decimate the near-end audio signal from the first bank of analysis filters; and
   a second bank of decimators coupled to receive and decimate the far-end audio signal from the second bank of analysis filters.

* * * * *